United States Patent Office 2,820,810
Patented Jan. 21, 1958

2,820,810
MANUFACTURE OF HALOALKYL HALOFORMATES

Ludo K. Frevel, Midland, and Leonard J. Kressley, Saginaw, Mich., assignors to The Dow Chemical Company, Midland, Mich., a corporation of Delaware No Drawing. Application August 16, 1956
Serial No. 604,308

5 Claims. (Cl. 260—463)

This invention concerns the preparation of haloalkyl haloformates. More particularly, it concerns the preparation of haloalkyl haloformates by a catalyzed liquid phase reaction between phosgene or a halogen analog thereof and a straight carbon chain alkylene oxide.

The preparation of haloalkyl haloformates by reacting ethylene chlorohydrin or trimethylene chlorohydrin with phosgene is known.

In accordance with this invention, it has now been discovered that straight carbon chain alkylene oxides can be reacted with phosgene or its halogen analogs, such as $COBr_2$, $COBrCl$, $COFCl$, and $COFBr$ in a liquid phase reaction in the presence of a catalytic amount, e. g., from about 0.01 to 2 percent by weight of the alkylene oxide, of a hydrogen halide to yield haloalkyl haloformates.

Any straight carbon chain alkylene oxide, such as ethylene oxide, propylene oxide, 1,2- and 2,3-butylene oxides, and the like is operable in this reaction.

The preferred hydrogen halide catalyst is hydrogen chloride although hydrogen bromide, hydrogen iodide or mixtures of such hydrogen halides can also be used. Alternatively, hydrogen halide can be formed in situ by introducing an amount of water or water vapor sufficient to liberate the desired amount of hydrogen halide by hydrolyzing phosgene or its halogen analogs. At least a molar equivalent of phosgene or a halogen analog thereof per mole of alkylene oxide is desirable in order to reduce the formation of diadducts and other byproducts. While larger proportions than 3 moles of phosgene per mole of alkylene oxide can be used, there is no advantage to be gained in exceeding 3 molar proportions of phosgene per mole of alkylene oxide.

The reactants may be mixed together in any order. The alkylene oxide is preferably added to the phosgene or halogen analog and the catalyst, suitably at about the rate at which the alkylene oxide is consumed.

In practice, a straight carbon chain alkylene oxide is gradually introduced into admixture with the liquid phosgene or a halogen analog in the desired proportions in the presence of a hydrogen halide catalyst at reaction temperatures between 0° and 65° C., preferably between 0° and 15° C. Upon completing the reaction, excess phosgene or its halogen analog is removed, preferably under reduced pressure. The crude reaction product is then fractionally distilled, suitably under reduced pressure, and the desired haloalkyl haloformate is thereby separated. The structure of the desired products was determined by infrared absorption, X-ray absorption and mass spectroscopy.

The following examples represent specific embodiments of this invention, parts and percentages therein being by weight.

Example 1

A quantity of 32 g. of propylene oxide was gradually added to 30 ml. of liquid phosgene containing 0.5 g. of anhydrous HCl over a period of 3 hours, while the reaction temperature was maintained between 0° and 15° C. The molar proportion of reactants was 1 to 1. The crude product was distilled. There was obtained 70.3 g. of 2-chloro-1-methylethyl chloroformate, B. P. 83° C. at 50 mm. The yield of said product was 82 percent, based on propylene oxide initially used.

Example 2

Phosgene at a rate of 12 grams per hour and hydrogen chloride at a rate of 0.04 gram per hour were bubbled into 176.6 grams of 1,2-butylene oxide maintained at temperatures between 24 and 34° C. contained in a flask fitted with a reflux condenser cooled to 2° C. to condense phosgene over a period of 20 hours. The molar proportion of phosgene to butylene oxide was about 1 to 1. A crude product weighing 313.5 g. was obtained. It was fractionally distilled to yield 163.5 g. (52.2 percent) of haloalkyl haloformates, distilling at 112° C. at 100 mm. pressure. This fraction was analyzed and determined to be a mixture of 80 percent alpha-chloromethylpropyl chloroformate and 20 percent of beta-chlorobutyl chloroformate.

Example 3

The procedure of Example 2 was repeated with 148.1 g. (2.06 moles) of cis-2,3-butylene oxide and 221.6 g. (2.24 moles) of phosgene at reaction temperatures ranging between 30° and 65° C. for the first 6 hours followed by room temperature for 16 hours. A crude product weighing 295.9 grams was obtained, from which was distilled 168 grams (57.8 percent) of a fraction having a boiling point of 103° C. at 100 mm. and a density of 1.205 at 25° C. This fraction was beta-chloroisobutyl chloroformate.

What is claimed is:

1. A liquid phase reaction process for preparing a haloalkyl haloformate which comprises reacting one molar proportion of a carbonyl halide of the group consisting of phosgene and its halogen analogs containing no more than one fluoro substituent with one molar proportion of a straight carbon chain alkylene oxide at temperatures between 0° and 65° C. in the presence of a catalytic amount of at least one hydrogen halide catalyst of the group consisting of hydrogen chloride, hydrogen bromide and hydrogen iodide.

2. A liquid phase reaction process which comprises adding a proportion of one mole of a straight carbon chain alkylene oxide to at least one molar proportion of a carbonyl halide of the group consisting of phosgene and its halogen analogs containing no more than one fluoro substituent at a reaction temperature between 0° and 65° C. in the presence of between 0.01 and 2 percent by weight of at least one hydrogen halide catalyst of the group consisting of hydrogen chloride, hydrogen bromide and hydrogen iodide, alkylene oxide basis, and fractionally distilling the reaction product to separate said haloalkyl haloformate.

3. A process as claimed in claim 2 in which the alkylene oxide is propylene oxide.

4. A process as claimed in claim 2 in which the alkylene oxide is 1,2-butylene oxide.

5. A process as claimed in claim 2 in which the alkylene oxide is 2,3-butylene oxide.

References Cited in the file of this patent

UNITED STATES PATENTS 2,636,906    Davis _____ Apr. 28, 1953

FOREIGN PATENTS 237,387      Switzerland _____ Aug. 1, 1945
1,010,961    France _____ Apr. 2, 1952

OTHER REFERENCES

Bronsted et al.: Jour. Amer. Chem. Soc., vol. 51, pgs. 428–29 (1929).